(12) United States Patent
Piket et al.

(10) Patent No.: US 7,599,483 B2
(45) Date of Patent: Oct. 6, 2009

(54) ECHO CANCELER CIRCUIT AND METHOD

(75) Inventors: James B. Piket, Gilbert, AZ (US); Keith L. Owens, Crystal Lake, IL (US); Christopher W. Springfield, Chandler, AZ (US)

(73) Assignee: Temic Automotive of North America, Inc., Deer Park, IL (US)

( * ) Notice: Subject to any disclaimer, the term of this patent is extended or adjusted under 35 U.S.C. 154(b) by 642 days.

(21) Appl. No.: 10/735,272

(22) Filed: Dec. 12, 2003

(65) Prior Publication Data

US 2005/0129224 A1    Jun. 16, 2005

(51) Int. Cl.
*H04M 9/08* (2006.01)
(52) U.S. Cl. ............................. 379/406.06; 379/406.02
(58) Field of Classification Search ................... 381/66; 379/406.06, 406.02
See application file for complete search history.

(56) References Cited

U.S. PATENT DOCUMENTS

| | | | |
|---|---|---|---|
| 5,099,472 A | 3/1992 | Townsend et al. | |
| 5,268,834 A | 12/1993 | Sanner et al. | |
| 5,353,348 A | 10/1994 | Sendyk et al. | |
| 5,365,583 A | 11/1994 | Huang et al. | |
| 5,563,944 A * | 10/1996 | Hasegawa | 379/406.04 |
| 5,646,991 A * | 7/1997 | Sih | 379/406.08 |
| 5,668,871 A | 9/1997 | Urbanski et al. | |
| 5,687,229 A | 11/1997 | Sih | |
| 6,122,506 A * | 9/2000 | Lau et al. | 455/427 |
| 6,195,430 B1 | 2/2001 | Eriksson et al. | |
| 6,282,176 B1 * | 8/2001 | Hemkumar | 370/276 |
| 6,420,975 B1 * | 7/2002 | DeLine et al. | 340/815.4 |
| 6,532,454 B1 | 3/2003 | Werbos | |
| 6,873,704 B1 * | 3/2005 | Park | 379/406.08 |
| 6,891,954 B2 * | 5/2005 | Takahashi et al. | 381/71.4 |
| 7,046,794 B2 | 5/2006 | Piket et al. | |
| 7,099,458 B2 | 8/2006 | Piket et al. | |
| 2003/0235294 A1 * | 12/2003 | Dyba et al. | 379/406.01 |
| 2004/0078104 A1 * | 4/2004 | Nguyen et al. | 700/94 |
| 2005/0129223 A1 | 6/2005 | Piket et al. | |
| 2005/0246171 A1 * | 11/2005 | Nakatsuka | 704/239 |

FOREIGN PATENT DOCUMENTS

WO    WO 97/07624    2/1997

OTHER PUBLICATIONS

European Patent Office Search Report for European Patent Application No. 04257707.2 dated Mar. 31, 2005.
European Search Report for European Application No. 04257675.1, dated Oct. 4, 2007.

* cited by examiner

*Primary Examiner*—Alexander Jamal

(57) ABSTRACT

An echo canceler circuit (10) and method attenuates at least post-echo canceler uplink data (90) to produce attenuated uplink data (100) in response to uplink echo return loss based attenuation data (40). The echo canceler circuit (10) includes an echo return loss based attenuation data generator (20) and at least an uplink data attenuator (30). The echo return loss based attenuation data generator (20) produces the uplink echo return loss based attenuation data (40) in response to echo return loss data (70). The echo return loss data (70) is based on at least one of: attenuated downlink data (50), pre-echo canceler uplink data (60), and/or amplifier gain data (80). The uplink data attenuator (30) attenuates the post-echo canceler uplink data (90) to produce attenuated uplink data (100) based on the uplink echo return loss based attenuation data (40).

19 Claims, 8 Drawing Sheets

ECHO CANCELER CIRCUIT AND METHOD

FIELD OF THE INVENTION

The invention relates generally to communication systems and more particularly to echo cancelers and echo cancellation methods.

BACKGROUND OF THE INVENTION

Echo in a communication system is commonly characterized as the return of a part of a transmitted signal from an end user back to the originator of the transmitted signal after a delay period. As is known in the art, a near end user transmits an uplink signal to a far end user. Conversely, the near end user receives a downlink signal from the far end user. Echo at the near end occurs when the near end user originates an uplink signal on the uplink path, and a part of the transmitted signal is reflected at the far end as an echo signal on the downlink path back to the near end. Echo at the far end occurs when the far end user originates a downlink signal on the downlink path, and a part of the transmitted signal is reflected at the near end, as an echo signal on the uplink path back to the far end. Typically, the echo delay period corresponds to the round trip transmission time in the communication system plus the dispersion or group delay of the echo generating source. The reflection of the transmitted signal may occur due to a number of reasons, such as an impedance mismatch in a four/two wire hybrid, or feedback from acoustic coupling in a telephone, wireless device or hands free speaker phone. An echo signal corresponding to the delayed transmitted signal is perceived as annoying to the near end user and in some cases can result in an unstable condition known as "howling."

Echo cancellers are required at any echo generating source at both the near end and at the far end in an attempt to eliminate or reduce the transmission of echo signals to the far end and near end. Echo cancelers may be employed in wireless devices, such as cellular phones, car phones, two-way radios, car kits for cellular telephones and other suitable devices. Additionally, echo cancelers may be employed in wireline devices, such as hands free speakerphones, video and audio conference phones and telephones otherwise commonly referred to in the telecommunications industry as plain old telephone system (POTS) devices. Hands free speakerphones typically include a microphone to produce the uplink signal, a speaker to acoustically produce the downlink signal, the echo canceler to cancel the echo signal and a telephone circuit.

The hands free speaker phone may be integrated into an in-vehicle audio system. The vehicle may be an automobile, a boat or an airplane, or any suitable vehicle. The in-vehicle audio system may include an amplifier, speakers and an audio source, such as a tuner module, CD/DVD player, tape player, satellite radio, etc. The in-vehicle audio system may be integrated with a communication apparatus, such as a telematics communication module. For example, the telematics communication module may be a component of a General Motors' OnStar system. The telematics communication module typically collects and disseminates data, such as location information and audio, such as speech.

Typically, the downlink audio signal received from the far end through the downlink path is played through the at least one speaker in the in-vehicle audio system. However, the hands free speaker phone installed in the vehicle may experience significant coupling between the at least one speaker and the microphone and is referred to herein as an acoustic coupling channel. As a result, an amplified downlink audio signal transmitted through the at least one speaker will be partially received by the microphone as an echo signal. The amplitude of the echo signal referred to herein as the echo return loss depends on the amount of coupling between the at least one speaker and the microphone.

Echo cancelers are known to attempt to cancel the echo signals produced at the near end when the far end is transmitting by generating echo estimation data corresponding to a portion of an amplified downlink audio signal traveling through the acoustic coupling channel. The echo canceler generates the echo estimation data through the use of an echo canceler adaptive filter. The echo canceler attempts to subtract the echo estimation data from pre-echo canceler uplink data received from the microphone in order to produce post-echo canceler uplink data. The echo canceler attempts to adapt to changes in the echo return loss by dynamically generating the echo estimation data via the echo canceler adaptive filter. Additionally, attenuators in the uplink path and in the downlink path may also be used to reduce the effect of the echo signals.

The echo canceler adaptive filter adapts not only between different calls, but also during a call, due to the nonfixed nature of the acoustic coupling channel between the at least one speaker and the microphone. For example, movement of passengers in the vehicle may affect the acoustic coupling channel and, therefore, the echo canceler attempts to dynamically adapt to the varying echo return loss. However, the pre-echo canceler uplink data may change due to variations in the acoustic coupling faster or beyond the capabilities of the echo canceler adaptive filter. As a result, due to imperfect knowledge of the network medium and the acoustic coupling channel creating the echo signal, the estimated echo data may contain errors.

Additionally, if the amplifier gain is increased, the downlink signal may cause the received microphone signal to be so great that the reduced echo return loss may significantly reduce the effectiveness of the adaptive filter and possibly cause the adaptive filter to become ineffective or possibly unstable. Consequently, the adaptive filter under this condition may actually cause the uplink signal to also become degraded, unstable, or corrupted. As a result, the corrupted post-echo canceler uplink data will cause annoying loud noises at the far end.

According to one method, the echo canceler attenuates the post-echo canceler uplink data based on the amplitude or power level of the post-echo canceler uplink data in an attempt to attenuate an echo signal transmitted on the uplink path before reaching the far end. However, an increase in the amplitude or power level of the post-echo canceler uplink data may occur due to an increase in the downlink data power and not due to a change in the acoustic coupling channel. As a result, the uplink data may be improperly attenuated causing the near end user not to be heard by the far end user because the echo canceler incorrectly interpreted an increase in post-echo canceler uplink data power due to an increase in downlink data power as an increase in acoustic coupling.

According to yet another method, the capabilities of the echo canceler adaptive filter are improved by, for example, increasing a number of coefficients in a finite impulse response filter (FIR). However, since the echo canceler adaptive filter is typically implemented in a processing device, increasing the number of coefficients may result in an increased processor load, and may reduce the rate of adaptation of the echo canceler adaptive filter and increase power consumption. As a result, a more complex and more costly echo canceler adaptive filter is required to satisfy the required processor load.

BRIEF DESCRIPTION OF THE DRAWINGS

The present invention is illustrated, by way of example and not limitation, in the accompanying figures, in which like reference numerals indicate similar elements, and in which.

DETAILED DESCRIPTION OF THE PREFERRED EMBODIMENT

Figure 1:
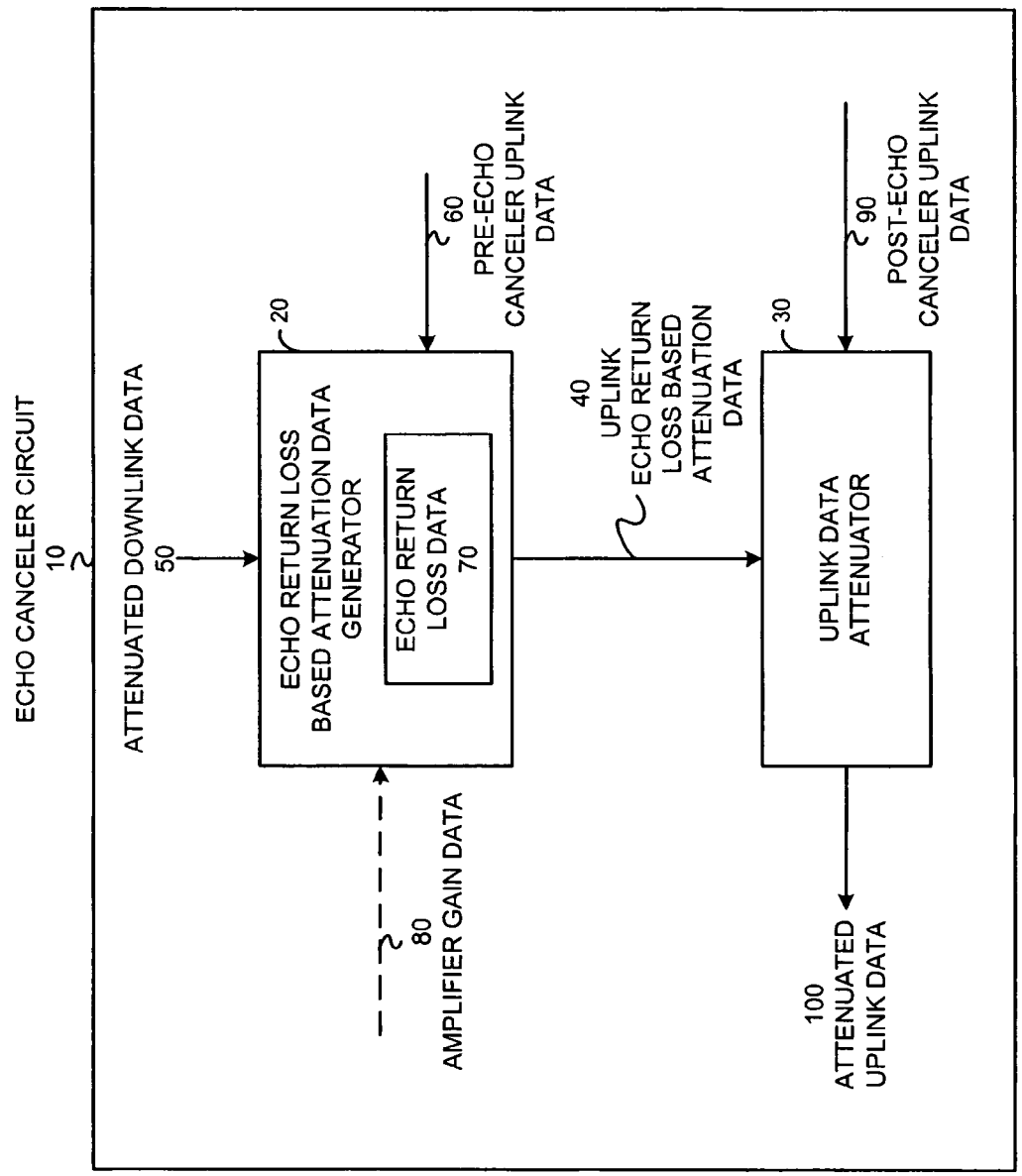
FIG. 1 is a block diagram illustrating one example of an echo canceler circuit according to one embodiment of the invention.

An echo canceler circuit and method attenuates at least post-echo canceler uplink data to produce attenuated uplink data in response to echo return loss data. The echo return loss data, according to one embodiment, is the ratio between the attenuated downlink data provided to the amplifier in an audio system and the pre-echo canceler uplink data received by a microphone. The echo canceler circuit includes an echo return loss based attenuation data generator and at least an uplink data attenuator. The echo return loss based attenuation data generator produces the uplink echo return loss based attenuation data in response to the echo return loss data, wherein the echo return loss data is based on at least one of: attenuated downlink data, pre-echo canceler uplink data and amplifier gain data. The uplink data attenuator attenuates the post-echo canceler uplink data to produce the attenuated uplink data based on the uplink echo return loss based attenuation data.

Among other advantages, the present invention permits the echo canceler circuit to more accurately detect a change in acoustic coupling or a change in an audio system, such as a change in amplifier gain. The echo canceler circuit detects a change in the acoustic coupling channel and in the audio system by detecting a change in the echo return loss data. Accordingly, any change in the acoustic coupling between the microphone and the speaker and any change in the audio path, such as a change in the audio gain as previously described, will cause a corresponding change in the echo return loss data.

According to one embodiment, the amplifier in the audio system is considered a part of the acoustic coupling channel. As a result, a change in the gain of the amplifier in the audio system will produce a corresponding change in amplitude in both the amplified downlink audio signal and the pre-echo canceler uplink data received by the microphone. Consequently, a change in amplifier gain will create a corresponding change in the echo return loss data. Accordingly, the echo canceler adaptive filter may adapt to both changes in the acoustic coupling channel as well as changes in the amplifier gain.

The echo canceler circuit tracks the echo return loss data and can determine if the echo return loss data decreases or increases above a particular rate beyond the capabilities of the adaptive filter. The echo canceler may quickly determine if the echo return loss exceeds the capabilities of the adaptive filter and attenuate the post-echo canceler uplink data in order to avoid the transmission of corrupted uplink data and thus avoid the transmission of annoying loud noises at the far end. For example, if the amplifier gain is increased, the echo canceler may determine that since the amplitude of the downlink audio data has not changed, then the increase in echo return loss is due to increased acoustic coupling, and therefore the echo canceler may take appropriate action to reduce the transmission of undesirable loud noises at the far end. Accordingly, the echo canceler may be able to quickly determine if the adaptive filter is about to become ineffective or possibly unstable and is about to produce corrupted data. Therefore, the echo canceler may attenuate the post-echo canceler uplink data before the adaptive filter becomes ineffective or possibly unstable and produces corrupted data. As previously discussed, the prior art method of attenuating the post-echo canceler uplink data and the downlink data based on the amplitude or power level of the post-echo canceler uplink data may be due to an increase in the downlink data power level and not due to a change in the acoustic coupling channel. Consequently, the echo canceler of the present invention avoids unnecessarily attenuating the post-echo canceler uplink data. As a result, the echo canceler will permit the near end user to speak as desired without being attenuated due to incorrectly interpreting the increase in post-echo canceler data power as an increase in acoustic coupling.

FIG. 1 is a block diagram of an echo canceler circuit 10 for determining if the acoustic coupling in a hands free speakerphone has increased or if a change has occurred in, for example, an amplifier gain in an audio system. The echo canceler circuit 10 may be one or more suitably programmed processors, such as a microprocessor, a microcontroller or a digital signal processor, and therefore includes associated memory containing executable instructions that when executed cause the echo canceler circuit 10 to carry out the operations described herein. In addition, the echo canceler circuit 10 as used herein may include discrete logic, state machines or any other suitable combination of hardware, software, middleware and/or firmware. The echo canceler circuit 10 may be employed to compensate due to acoustic coupling between a microphone and a speaker or due to an increase in an amplifier gain. For example, the echo canceler circuit 10 may be employed in an analog or digital modem in a telecommunication system as is known in the art.

The echo canceler circuit 10 includes an echo return loss based attenuation data generator 20, and an uplink data attenuator 30. The echo return loss based attenuation data generator 20 produces uplink echo return loss based attenuation data 40 in response to receiving attenuated downlink data 50, pre-echo canceler uplink data 60 and, optionally, amplifier gain data 80. The various links coupling attenuation generator 20 and uplink data attenuator 30 may be any suitable mechanism for conveying an electrical signal or data as appropriate.

According to one embodiment, the echo return loss data 70 is based on a ratio of the attenuated downlink data 100 and the pre-echo canceler uplink data 60. The echo return loss based attenuation data generator 20 produces the uplink echo return loss based attenuation data 40 in response to calculating the echo return loss data 70. The echo return loss based attenuation data generator 20 may calculate the power level or amplitude level of the attenuated downlink data 50, the pre-echo canceler uplink data 60 and the post-echo canceler data 90 based on an average over one or more speech frames. For example, a speech frame may span a period of 20 milliseconds corresponding to 160 samples at 8,000 samples per second. Alternatively, the speech frame may correspond to any suitable period of time and any suitable number of samples and at any suitable sampling rate.

Figure 2:
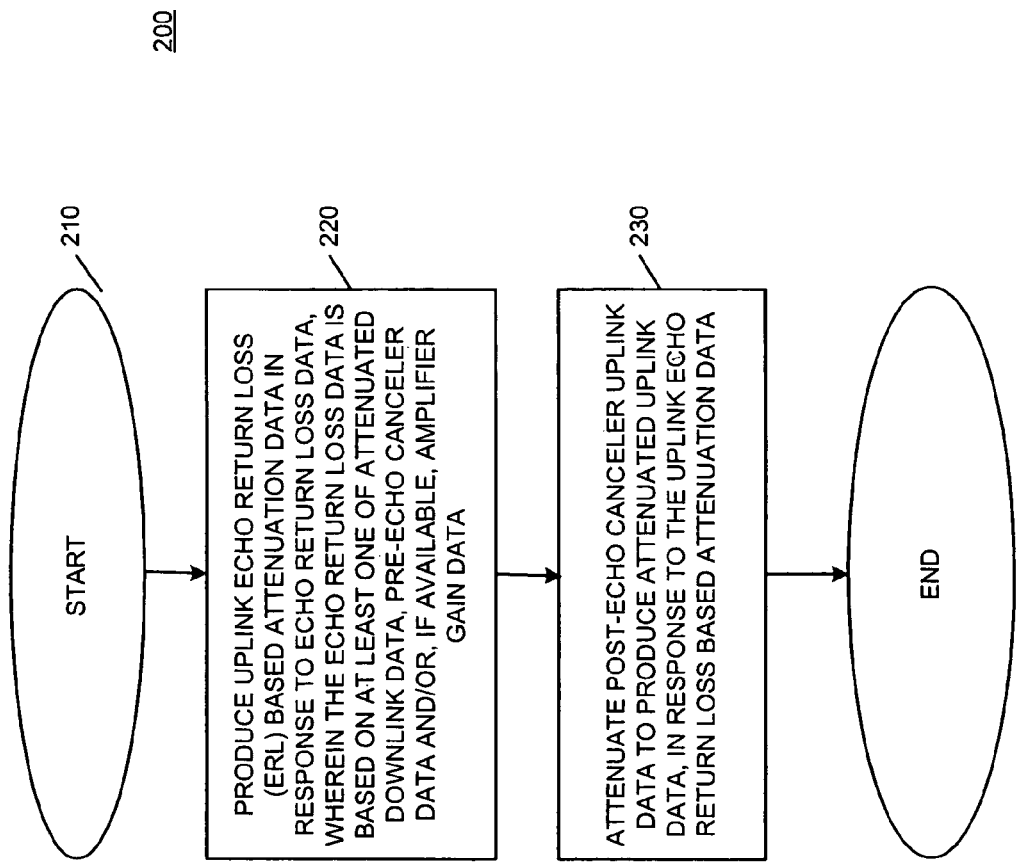
FIG. 2 is a flowchart illustrating one example of a method for attenuating post-echo canceler uplink data according to one embodiment of the invention.

FIG. 2 illustrates a method 200 for attenuating echo data according to one embodiment of the invention. The method 200 may be carried out by the echo canceler circuit 10 with respect to FIG. 1. However, any other suitable structure may also be used. It will be recognized that the method 200, beginning with step 210 will be described as a series of operations, but the operations may be performed in any suitable order and may be repeated in any suitable combination.

As shown in step 220, the echo return loss based attenuation data generator 20 produces uplink echo return loss based attenuation data 40 based on at least one of attenuated downlink data 50, pre-echo canceler data 60 and, if available, amplifier gain data 80. As previously discussed, the uplink echo return loss based attenuation data 40 may be based on a ratio of the attenuated uplink data 50 and the pre-echo canceler uplink data 60. Additionally, the echo return loss based attenuation data generator 20 may produce downlink echo return loss based attenuation data in order to attenuate an appropriate downlink data attenuator as will be discussed below.

As shown in step 230, uplink data attenuator 30 attenuates post-echo canceler uplink data 90 to produce the attenuated uplink data 100 in response to the uplink echo return loss based attenuation data 40. According to one embodiment, the echo return loss based attenuation data generator 20 causes the uplink data attenuator 30 to attenuate the post-echo canceler uplink data 90 over a period of time to produce the attenuated uplink data 100.

Figure 3:
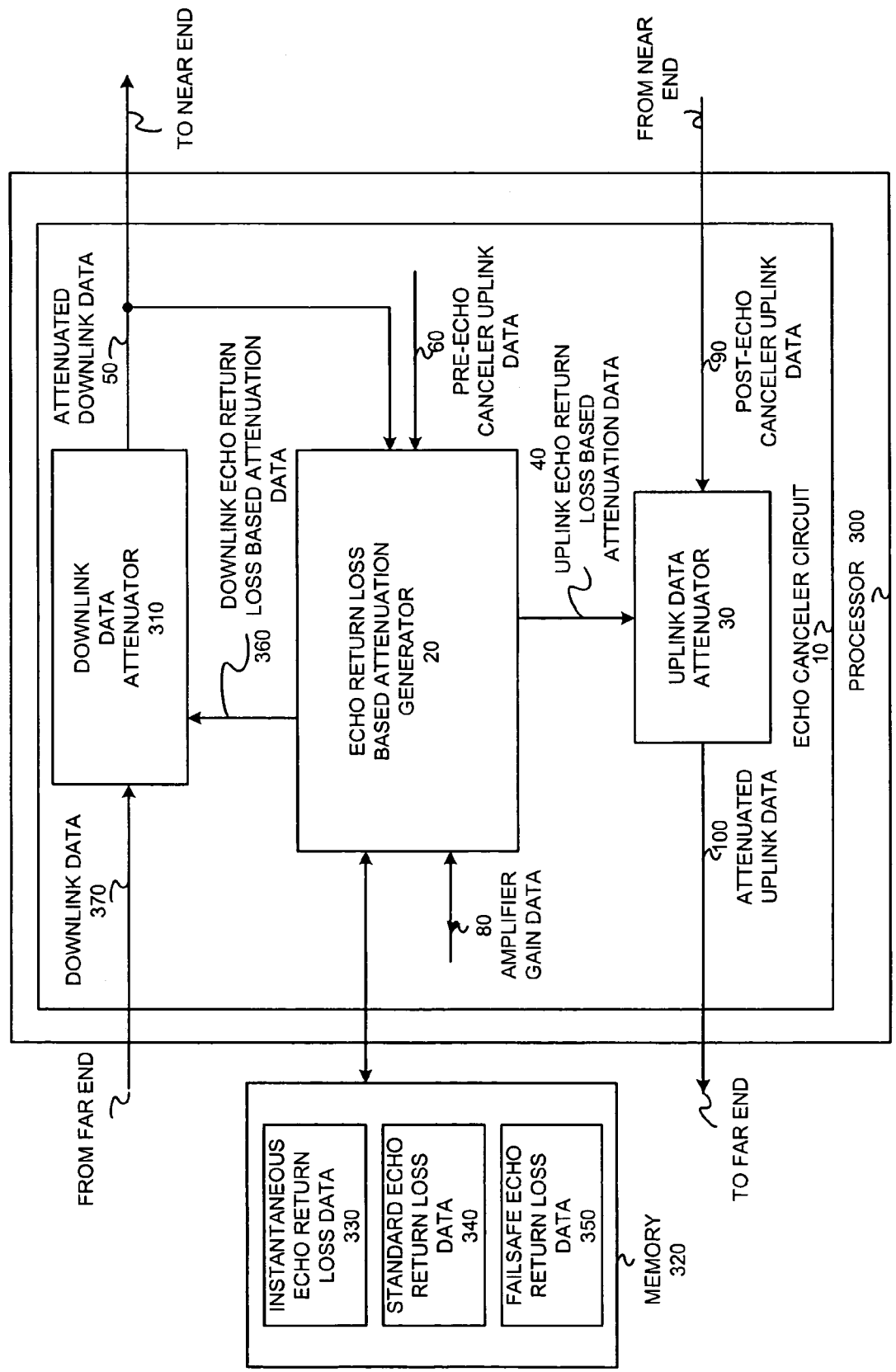
FIG. 3 is a block diagram illustrating another example of the echo canceler circuit according to another embodiment of the invention.

FIG. 3 is a block diagram of a processor 300 employing the echo canceler circuit 10 as previously discussed with respect to FIG. 1 in accordance with another embodiment of the invention. Echo canceler circuit 10 further includes downlink data attenuator 310. Processor 300 includes echo canceler circuit 10 coupled to memory 320. Memory 320 further includes instantaneous echo return loss data 330, standard echo return loss data 340 and failsafe echo return loss data 350. The memory 320 may be, for example, random access memory (RAM), read only memory (ROM), optical memory or any suitable storage medium located locally or remotely, such as via a server. Additionally, the memory 320 may be accessible by a base station, switching system or any suitable network element via the Internet, a wide access network (WAN), a local area network (LAN), a wireless wide access network (WWAN), a wireless local area network (WLAN), an IEEE 802.11 wireless network, a Bluetooth® network or any suitable communication interface or network.

According to this embodiment, the echo return loss based attenuation data generator 20 produces downlink echo return loss based attenuation data 360 based on: pre-echo canceler uplink data 60, attenuated downlink data 50, instantaneous echo return loss data 330 and amplifier gain data 80. The downlink data attenuator 310 is coupled to the echo return loss based attenuation data generator 20. The downlink data attenuator 310 receives downlink data 370 and the downlink echo return loss based attenuation data 360 and in response attenuates the downlink data 370 to produce the attenuated downlink data 50. According to one embodiment, either or both the downlink data attenuator 310 and the uplink data attenuator 30 may be programmed with an attenuation value of 0 dB such that no attenuation is applied to the post-echo canceler uplink data 90 or the downlink data 370. As a result, the downlink data attenuator 310 and the uplink data attenuator 30 may appear as a low impedance path as is known in the art.

Figure 4:
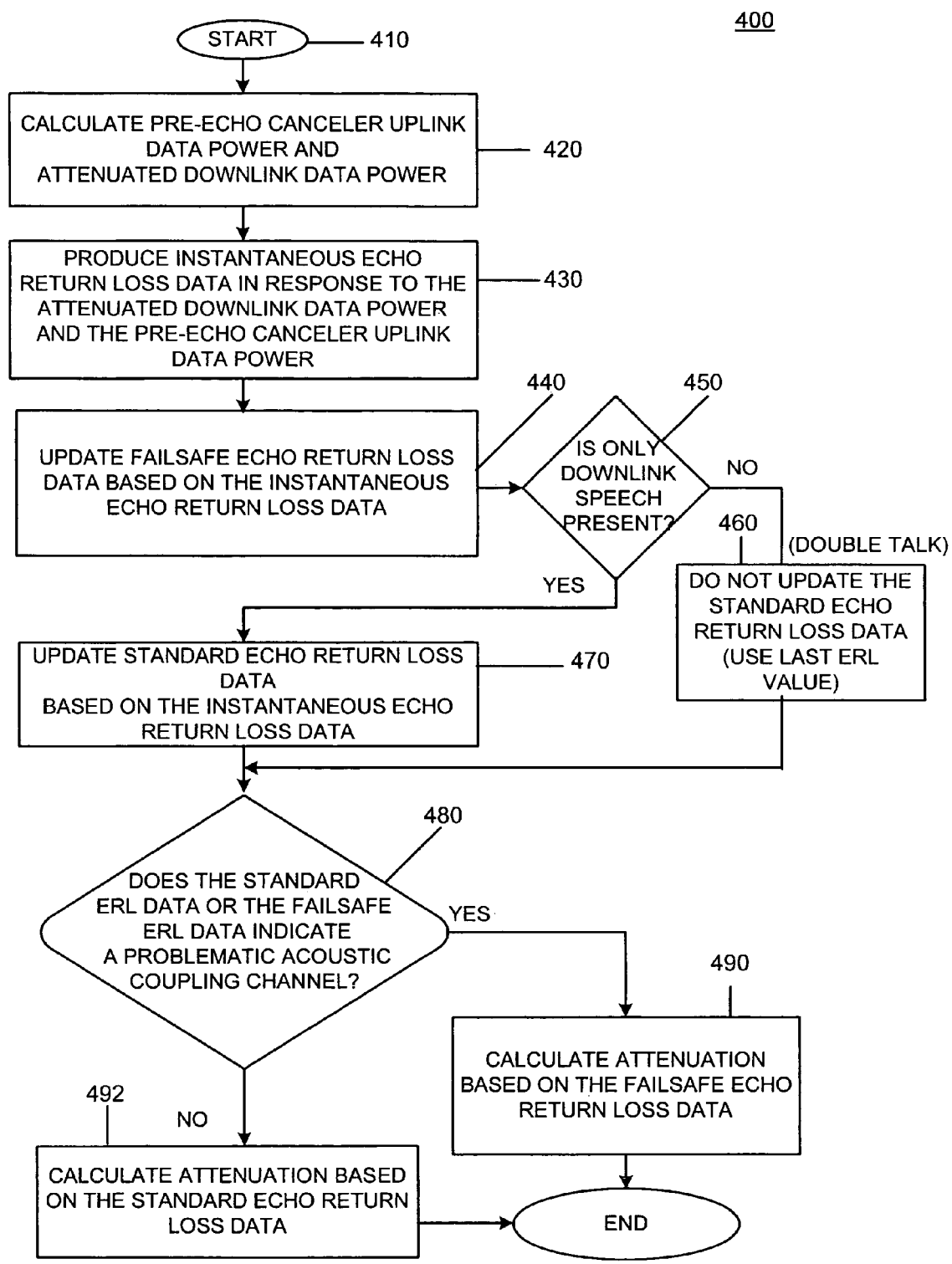
FIG. 4 is a flowchart illustrating one example of a method for calculating attenuation based on echo return loss data according to one embodiment of the invention.

FIG. 4 illustrates a method 400 for attenuating the post-echo canceler uplink data 90 and the downlink data 370 according to one embodiment of the invention. The method 400 may be carried out by the echo canceler 10; however, any other suitable structure may also be used. It will be recognized that the method 400 beginning with step 410 will be described as a series of operations, but the operations may be performed in any suitable order and may be repeated in any suitable combination.

As shown in step 420, the echo return loss based attenuation data generator 20 calculates a power level associated with the pre-echo canceler uplink data 60 and also calculates a power level associated with the attenuated downlink data 50. As previously discussed, the value of the pre-echo canceler uplink data 60 and the value of the attenuated downlink data 50 may be based on a sample value averaged over a suitable period of time. Accordingly, the amplitude of the attenuated downlink data 50 and of the pre-echo canceler uplink data 60 may be determined as is known in the art.

As shown in step 430, the echo return loss based attenuation data generator 20 produces the instantaneous echo return loss data 330 in response to calculating the power level of the attenuated downlink data 50 and the power level of the pre-echo canceler uplink data 60. Accordingly, the echo return loss based attenuation data generator 20 will calculate an instantaneous echo return loss 330 for every corresponding received value of pre-echo canceler uplink data 60 and attenuated downlink data 50. The echo return loss based attenuation data generator 20 may produce the instantaneous echo return loss data 330 based on a ratio of the attenuated downlink data 50 and the pre-echo canceler uplink data. For example, the instantaneous echo return loss data 330 may correspond to a new calculated value for each received value of attenuated downlink data 50 and for each received value of pre-echo canceler uplink data 60. As previously stated, the values for the downlink data 370 and the pre-echo canceler uplink data 60 may be provided on a per-sample basis and may be averaged over a sample period as is known in the art.

As shown in step 440, the echo return loss based attenuation data generator 20 updates the fail-safe echo return loss data 350 based on the instantaneous echo return loss data 330. Accordingly, the echo return loss based attenuation data generator 20 produces the fail-safe echo return loss data 350 for every suitable corresponding received value of attenuated downlink data 50 and pre-echo canceler uplink data 60.

As shown in step 450, if the echo return loss based attenuation data generator 20 determines that only downlink speech is present, then processing continues at step 460. However, if the echo return loss based attenuation data generator 20 determines that downlink speech is present along with a desired near-end transmit signal, then, for example, the echo canceler circuit 10 may be in a double talk state. As is known in the art, the echo canceler circuit 10 may at any point in time be in any one of four states: uplink transmit, downlink receive, idle and double talk. If the echo return loss based attenuation data generator 20 determines that the echo canceler circuit 10 is in a double talk mode, then processing continues at step 460.

At step 460, the echo return loss based attenuation data generator 20 does not update the standard echo return loss data 340. Accordingly, the standard echo return loss data 340 retain the previous value prior to detection of the double talk mode by the echo return loss based attenuation data generator 20.

As shown in step 470, if a double talk condition is not detected, then the echo return loss based attenuation data generator 20 updates the standard echo return loss data 340 based on the instantaneous echo return loss data 330. The echo return loss based attenuation data generator 20 updates the standard echo return loss data 340 based on the most recent value of instantaneous echo return loss data 330.

As shown in step 480, the echo return loss based attenuation data generator 20 determines if either the standard echo return loss data 340 or the failsafe echo return loss data 350 indicate a problematic acoustic coupling channel. For example, the problematic acoustic coupling channel may be determined based on comparing either the instantaneous echo return loss data 330 or the standard echo return loss data 340 with a threshold echo return loss level. If either the instantaneous echo return loss data 330 or the standard echo return loss data 340 increases above a predetermined echo return loss threshold value level, then such a determination may indicate that the acoustic coupling between the speaker and the microphone may be too great such that the echo canceler adaptive filter will become ineffective or possibly unstable. Alternatively, the echo return loss based attenuation data generator 20 may determine a problematic acoustic coupling channel exists if the rate of change for the instantaneous echo return loss data 330 and the standard echo return loss data 340 changes above a threshold level. If the standard echo return loss data 340 or the failsafe echo return loss data 350 indicates a problematic acoustic coupling channel, then processing continues at step 490, otherwise processing continues at step 492.

At step 490, the echo return loss based attenuation data generator 20 calculates the uplink echo return loss based attenuation data 40 and the downlink echo return loss based attenuation data 360 based on the failsafe echo return loss data 350. Accordingly, if a problematic acoustic coupling channel does exist, then the echo canceler adapter filter may have become ineffective or possibly unstable and thus may be producing corrupted post-echo canceler uplink data 90. As a result, the echo return loss based attenuation data generator 20 will calculate the uplink echo return loss based attenuation data 40 and the downlink echo return loss based attenuation data 360 based on the failsafe echo return loss data 350.

As shown in step 492, the echo return loss based attenuation data generator 20 calculates the downlink echo return loss based attenuation data 360 and the uplink echo return loss based attenuation data 40 based on the standard echo return loss data 340. Accordingly, since a problematic acoustic coupling channel does not exist, then the current value of the standard echo return loss data 340 will be appropriately used to calculate both the downlink echo return loss based attenuation data 360 and the uplink echo return loss based attenuation data 40.

Figure 5:
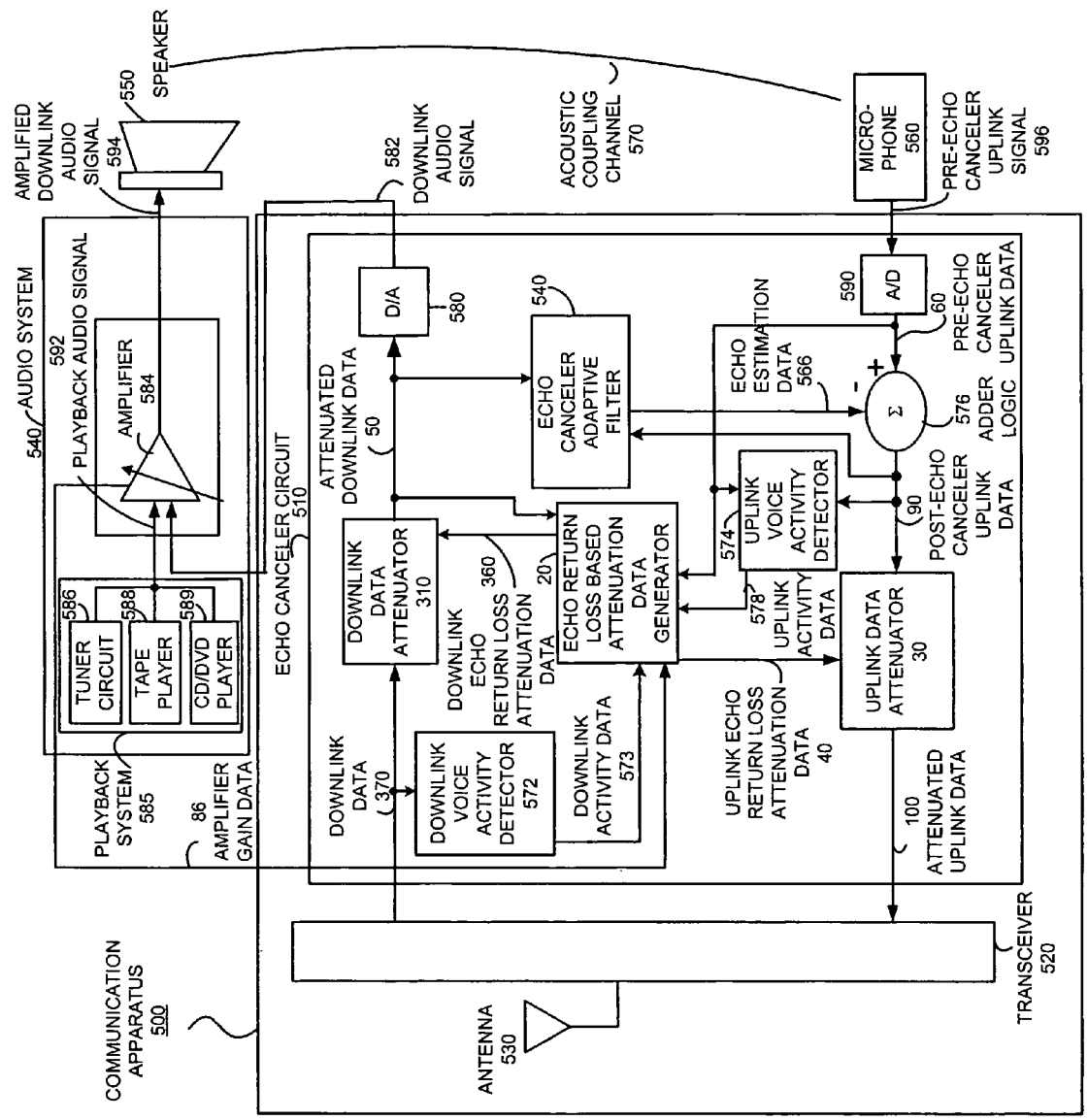
FIG. 5 is a block diagram illustrating one example of a communication apparatus and audio system according to one embodiment of the invention.

FIG. 5 is a block diagram of a communication apparatus 500 in accordance with one embodiment of the invention. The communication apparatus 500 includes an echo canceler circuit 510 and a transceiver 520. The transceiver 520 is coupled to an antenna 530. The audio system 540 is coupled to at least one speaker 550. Coupling between the microphone 560 and the at least one speaker 550 is represented by an acoustic coupling channel 570. The transceiver 520 is coupled to the downlink data attenuator 310 and the uplink data attenuator 30. The uplink data attenuator 30 provides the attenuated uplink data 100 to the transceiver 520 and the downlink data attenuator 310 receives downlink data 370 from the transceiver 520.

The communication apparatus 500 refers to a device supporting the collection and dissemination of data, including audio speech, such as a telematics communication module. According to one embodiment, the telematics communication module includes, for example, emergency assistance provided based on General Motors' OnStar system, which automatically calls for assistance if the vehicle is in an accident. According to another embodiment, the telematics communication module also can perform such functions as remote engine diagnostics, tracking stolen vehicles and providing roadside assistance, as well as other functions.

The echo canceler circuit 510 includes an echo canceler adapter filter 540, a downlink voice activity detector 572, an uplink voice activity detector 574, adder logic 576, a digital to analog converter 580 and an analog to digital converter 590. The downlink voice activity detector 572 receives the downlink data 370 and produces the downlink activity data 573. Uplink voice activity detector 574 receives the post-echo canceler uplink data 90 and the pre-echo canceler uplink data 60 and produces uplink activity data 578. The echo canceler adaptive filter 540 receives the post-echo canceler uplink data 90 and the attenuated downlink data 50 and in response produces echo estimation data 566. The adder logic 576 receives the pre-echo canceler uplink data 60 and subtracts the echo estimation data 566 and in response produces the post-echo canceler uplink data 90. Accordingly, the echo canceler adaptive filter 540 seeks to produce the echo estimation data by adapting to the echo received by the microphone 560 due to the acoustic coupling channel 570 between the at least one speaker 550 and the microphone 560 and due to the audio system 540.

The digital to analog converter 580 receives the attenuated downlink data 50 and in response produces a downlink audio signal 582. For example, the digital to analog converter 580 may be any suitable digital to analog converter suitable for converting the attenuated downlink data 50 into the downlink audio signal 582. For example, if the attenuated downlink data 50 represent a 16-bit word sample, then the digital to analog converter 580 may convert each 16-bit data sample into the downlink audio signal 582. For example, the digital to analog converter 580 may include a filter and an appropriate gain stage in order to remove the effects of aliasing as is known in the art.

The audio system 540 includes an amplifier 584 having a variable gain and a playback system 585, including a tuner circuit 586, a tape player 588 and a CD and/or DVD player 589. The audio system 540 may be an in-vehicle car audio system suitable for playback of preprogrammed audio such as music, voice or any other suitable programming material. For example, the tuner circuit 586 may be a satellite radio, an FM tuner, an AM tuner or any other suitable tuner. The tuner circuit 586, the tape player 588 and the CD and/or DVD player 590 provide a playback audio signal 592 to the amplifier 584. For example, a switch, not shown, may select from either the tuner circuit 586, the tape player 588 or the CD and/or DVD player 590 for producing the playback audio signal 592.

The amplifier 584 receives the downlink audio signal 592 from the digital to analog converter 580 and the playback audio signal 592 and in response produces an amplified downlink audio signal 594. The amplified downlink audio signal 594 corresponds to the playback audio signal 592 that is amplified by the amplifier 584 where an amount of amplification is represented by an amplifier gain. The amplifier 584 has a variable gain to allow a user to control the amplitude of the amplified downlink audio signal 594.

As is known in the art, the amplified downlink audio signal 594 is played through the at least one speaker 550 in an environment, such as the interior of a vehicle. The speaker 550 may represent one or more speakers, such as a speaker system in a vehicle. According to one embodiment, the vehicle has four or more audio speakers. Similarly, the amplifier 584 may represent one or more amplifiers in order to provide stereophonic playback or quadraphonic playback.

Microphone 560 receives at least a portion of the acoustically produced amplified downlink audio signal 594 and in response produces a pre-echo canceler uplink signal 596. The analog to digital converter 590 receives the pre-echo canceler uplink signal 596 and in response produces the pre-echo canceler uplink data 60. The analog to digital converter 590 provides the pre-echo canceler uplink data 60 to the adder logic 570 for subtraction with the echo estimation data 566 in order to produce the post-echo canceler uplink data 90 as previously discussed. The analog to digital converter 590 also provides the pre-echo canceler uplink data 60 to the echo return loss base attenuation generator 20.

The echo return loss based attenuation data generator 20 also receives the attenuated downlink data 50. As a result, the echo return loss based attenuation data generator 20 may calculate the echo return loss as previously discussed to produce the echo return loss data 70, the instantaneous echo return loss data 330, the standard echo return loss data 340 and the fail-safe echo return loss data 350 as previously discussed. As a result, the echo return loss based attenuation data generator 20 may determine a change in the amplifier gain of amplifier 584 based on determining the instantaneous echo return loss data 330. For example, since the instantaneous echo return loss data 330 are based on a ratio of the attenuated downlink data 50 and the pre-echo canceler uplink data 60, if the gain in the amplifier 584 changes, then the amplitude of the amplified downlink audio signal 594 will change as well. Assuming that the acoustic coupling channel 570 remains relatively or substantially constant, then the amplitude of the pre-echo canceler uplink signal 596 will change as a result of the change in the amplifier gain 584. Consequently, the echo return loss based attenuation data generator 20 will detect an increase in amplitude in the pre-echo canceler uplink data 60 while also determining that the attenuated amplitude or power level of the attenuated downlink data 50 has not changed. As a result, the echo return loss based attenuation data generator 20 may determine that, since the instantaneous echo return loss data 330 have changed but the power level of the attenuated downlink data 50 has not changed, then either the amplifier gain of the amplifier 584 has changed or the acoustic coupling channel 570 may have changed. Depending on the amount of change or the rate of change of the instantaneous echo return loss data 330, the echo return loss based attenuation data generator 20 may determine the likely cause of the change in the instantaneous echo return loss data 330. For example, if the instantaneous echo return loss data 330 change rather suddenly, then the likely cause of the change may be due to a sudden increase in amplifier gain of the amplifier 584.

According to one embodiment, the uplink data attenuator 30 attenuates the post-echo canceler uplink data 90 over a period of time to produce the attenuated uplink data 100 in response to receiving the uplink echo return loss attenuation data 40. As previously discussed, once the echo return loss based attenuation data generator 20 determines the likely cause of the change in the instantaneous echo return loss data 330, then the attenuation in uplink data attenuator 30 may be changed. Similarly, the echo return loss based attenuation data generator 20 may provide the downlink echo return loss attenuation data 360 to the downlink data attenuator 310 to attenuate the downlink data 370 in an appropriate manner.

Figure 6:
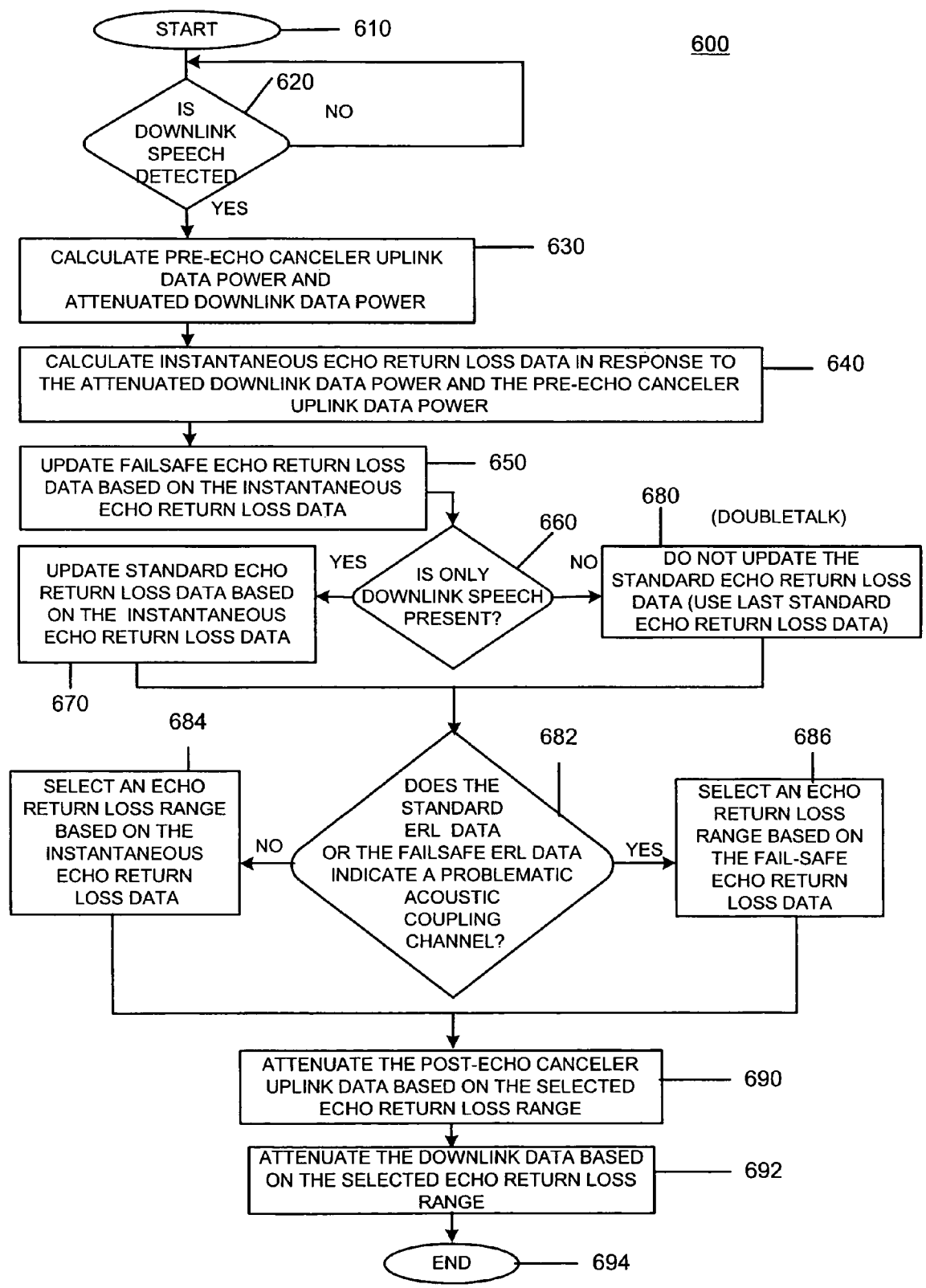
FIG. 6 is a flowchart illustrating another example of a method for attenuating post-echo canceler uplink data and downlink data.

FIG. 6 illustrates a method 600 for attenuating the post-echo canceler uplink data 90 and the downlink data 370 based on a selected echo return loss range. The method 600 may be carried out by the echo canceler circuit 510. However, any other suitable structure may also be used. It will be recognized that the method beginning with step 610 will be described as a series of operations. The operations may be performed in any suitable order that may be repeated in any suitable combination. For example, the method 600 may be repeated or may be performed in a loop as is well known in the art.

As shown in step 620, the echo return loss based attenuation data generator 20 determines if downlink speech is detected. For example, downlink speech may be detected by the downlink voice activity detector 572. The downlink voice activity detector 550 may then produce the downlink activity data 573 in response to detecting downlink voice activity. The downlink voice activity detector 572 may detect downlink voice activity based on comparing the amplitude or power level of the downlink data 370 with a threshold value. Alternatively, the downlink voice activity detector 550 may detect voice activity based on tracking a rate of change of the amplitude or power level of the downlink data 370 as is known in the art.

If downlink speech is not detected, then processing continues until downlink speech is detected by looping back to step 620 for the detection of speech. If the echo return loss based attenuation data generator 20 receives downlink activity data 573 indicating that the downlink voice activity detector 572 has detected downlink speech, then the echo return loss based attenuation data generator 20 calculates an amplitude or power level associated with the pre-echo canceler uplink data 60 and an amplitude or power level associated with the attenuated downlink data 50.

As shown in step 640, the echo return loss based attenuation data generator 20 calculates the instantaneous echo return loss data 330 in response to calculating the amplitude or power level associated with the attenuated downlink data 50 and the pre-echo canceler uplink data 60. For example, the instantaneous echo return loss data 330 corresponds to the ratio of the attenuated downlink data 50 and the pre-echo canceler uplink data 60.

As shown in step 650, the echo return loss based attenuation data generator 20 updates the fail safe echo return loss data 350 based on the instantaneous echo return loss data 330. Accordingly, the fail-safe echo return loss data 350 will correspond to the echo return loss data 330 and therefore in effect stores the previous value of the echo return loss data 330.

As shown in step 660, the echo return loss based attenuation data generator 20 determines if only downlink speech is present. For example, the echo return loss based attenuation data generator 20 may determine that only downlink speech is present if voice activity is detected by the downlink voice activity detector 550 but no voice activity is detected by uplink voice activity detector 560. According to one embodiment, only downlink speech is present if the downlink voice activity detector 550 determines that the amplitude or power level of the attenuated downlink data 50 exceeds a predetermined threshold and the uplink voice activity detector 560 determines that the amplitude or power level associated with the pre-echo canceler uplink data 60 is below a threshold level. As a result, the echo return loss based attenuation data generator 20 may determine that downlink speech is present based on the downlink activity data 573 indicating that downlink speech is present. Further, the uplink voice activity detector 574 may provide uplink activity data 578 indicating that uplink speech is not present.

As shown in step 670, if the echo return loss based attenuation data generator 20 determines that only downlink speech is present, then the echo return loss based attenuation data generator 20 updates the standard echo return loss data 340 based on the instantaneous echo return loss data 330. For example, since only downlink speech is likely present, then a double talk condition is not likely to exist. As a result, the instantaneous echo return loss data 330 will likely accurately represent the acoustic coupling channel 570. Accordingly, the standard echo return loss data 340 are updated with the instantaneous echo return loss data 330.

As shown in step 680, if, however, the echo return loss based attenuation data generator 20 determines that a double talk condition exists then the standard echo return loss data 340 are not updated. As a result, the standard echo return loss data 340 retain the previous generated value since the instantaneous echo return loss data 330 were calculated during the double talk condition. For example, the instantaneous echo return loss data 330 calculated during the double talk mode may possibly have become corrupted due to the near end user talking at the same time that the far end user is talking.

As shown in step 682, the echo return loss based attenuation data generator 20 determines if the standard echo return loss data 340 or the fail-safe echo return loss data 350 indicate a problematic acoustic coupling channel 570. For example, the problematic acoustic coupling channel 570 may be caused by an excessive amount of amplifier gain, an unacceptably high level of acoustic coupling in the acoustic coupling channel 570 or by any one of a number of conditions, such as the presence of noise that is received by the microphone 560 as is known in the art. As previously stated, the echo return loss based attenuation data generator 20 may monitor the difference between the standard echo return loss data 340 and the fail safe echo return loss data 350 to determine if a change or a rate of change in the echo return loss has occurred beyond a threshold level.

As shown in step 684, if the echo return loss based attenuation data generator 20 determines that the acoustic coupling channel 570 is not problematic, then the echo return loss based attenuation data generator 20 may select one of a group of echo return loss ranges based on the instantaneous echo return loss data 330. For example, the group of echo return loss ranges may correspond with, for example, a range of values corresponding to an attenuation level applied to the uplink data attenuator 30 and the downlink data attenuator 310. For example, the range of the instantaneous echo return loss data 330 may fall within a range from, for example, 40 dB, which corresponds to a relatively high level of isolation between the speaker 550 and the microphone 560, to −20 dB, which corresponds to a high level of coupling between speaker 550 and microphone 560. A coupling of −20 dB, −25 dB or, alternatively, −30 dB indicates that the amplitude or power level of the pre-echo canceler uplink signal 596 is greater than the amplitude or power level of the attenuated downlink data 50. According to one embodiment, the amplitude or power level of the pre-echo canceler uplink signal 596 may be 20 dB greater than the amplitude or power level of the attenuated downlink data 50 because the gain of the amplifier 584 could increase the amplitude or power level of the downlink audio signal 582 such that the amplitude or power level of the amplified downlink audio signal 594 is at an amplitude or power level that is 20 dB greater than a direct coupling between the speaker 550 and the microphone 560. Under this situation, for example, the echo canceler adaptive filter 576 may become ineffective or possibly unstable and produce corrupted echo estimation data 576.

As shown in step 686, the echo return loss based attenuation data generator 20 selects an echo return loss range based on the fail safe echo return loss data 350. According to this embodiment, since the echo return loss based attenuation data generator 20 has determined that a problematic acoustic coupling channel 570 exists, then the instantaneous echo return loss data 330 may not accurately represent the current echo return loss, and therefore the fail safe echo return loss data 350 is utilized to determine the appropriate level of attenuation for the uplink data attenuator 30 and the downlink data attenuator 310.

As shown in step 690, the echo return loss based attenuation data generator 20 provides uplink echo return loss attenuation data 40 to the uplink data attenuator 30 to attenuate the post-echo canceler uplink data 90 based on the selected echo return loss range. For example, the application of the amount of attenuation may be nonlinear with respect to the level of echo return loss. If the instantaneous echo return loss data 330 indicates a high level of isolation between the speaker 550 and the microphone 560 such that there is a relative low level of coupling in the acoustic coupling channel 570, then the level of attenuation, if any, will be relatively low. However, if the instantaneous echo return loss data 330 begins to decrease, thus indicating a gradual increase in coupling in the speaker 550 and the microphone 560, then the amount of attenuation may increase more dramatically. As a result, if the instantaneous echo return loss data 330 approach a level known to cause the echo canceler adaptive filter 540 to become ineffective or possibly unstable, then the amount of attenuation may be increased more aggressively (i.e., exponentially) in order to prevent the transmission of corrupted data causing annoying noises to be played at the far end.

As shown in step 692, the echo return loss based attenuation data generator 20 may provide downlink echo return loss attenuation data 360 to the downlink data attenuator 310 to attenuate the downlink data 370 based on the selected echo return loss range. As stated above, the amount of attenuation may be progressively increased with respect to a decrease in the instantaneous echo return loss data 330.

As shown in step 694, the method 600 may end, but, as previously stated and as known in the art, the method 600 may continue by looping back to the start at 610 or at any suitable location in method 600.

Figure 7:
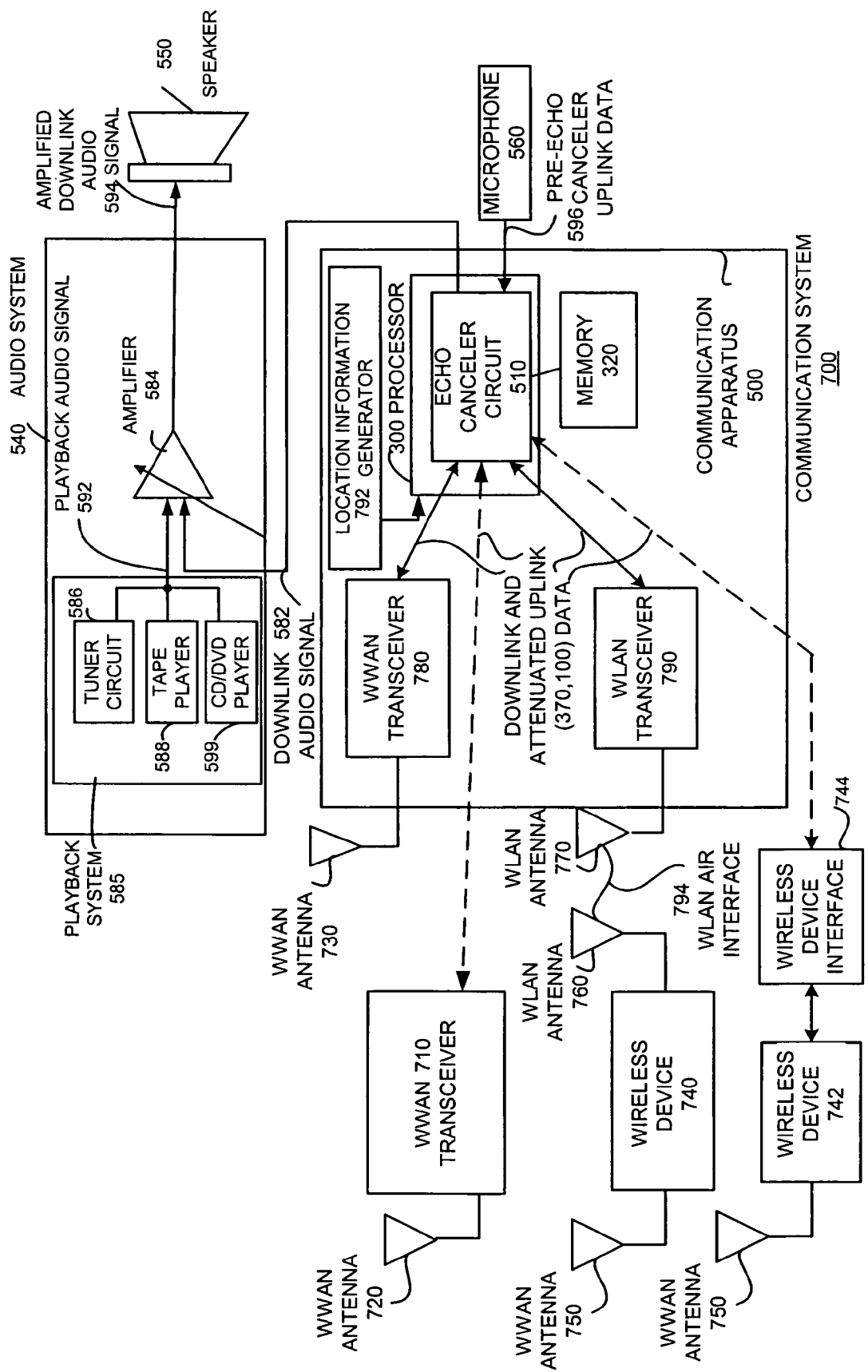
FIG. 7 is a block diagram illustrating an example of a communication system according to one exemplary embodiment of the invention.

FIG. 7 is a block diagram of a communication system 700 according to one exemplary embodiment of the invention. The communication system 700 includes the communication apparatus 500, the audio system 540, the at least one speaker 550, the microphone 560, a wireless wide area network (WWAN) transceiver 710, wireless wide area network antennas 720, 730, wireless devices 740, 742, a wireless wide area network antenna 750, a WWAN antenna 760, and a wireless local area network (WLAN) antenna 770. The communication apparatus 500 includes the previously described components, including processor 300, and further includes a WWAN transceiver 780 and/or a WLAN transceiver 790 and a location information generator 792.

According to one alternative embodiment, the echo canceler circuit 510 is coupled to either one of or any combination of the WWAN transceiver 780, the WWAN 710 and the WLAN transceiver 790. For example, the WWAN transceiver 780, 710 may represent any one of a number of wireless devices such as, for example, a portable cellular phone, an in-vehicle mobile phone, a wireless personal digital assistant (PDA), a wireless fidelity device (WiFi, i.e., a device based on the IEEE 802.11 specification), or any suitable communication device. According to another embodiment, the WWAN transceiver 710 may be external to the communication apparatus 500 and therefore the echo canceler circuit 510 may be coupled to the WWAN transceiver 710 via an appropriate link. According to another embodiment, the WLAN transceiver 790 may be integrated into the communication apparatus 500.

The WLAN transceiver 790 may be a Bluetooth compliant device or a wireless fidelity device (WiFi, i.e., a device based on the IEEE 802.11 specification), or any suitable communication device. For example, the WLAN transceiver 790 may interface with the wireless device 740 via a WLAN air interface 794, between WLAN antenna 760 and WLAN antenna 770. The wireless devices 740, 742 may be a cellular phone, a personal digital assistant equipped with a wireless interface, or a portable computer also equipped with a wireless wide area network interface. Alternatively, the wireless devices 740, 742 may communicate with the echo canceler circuit 510 via a wireless device interface 744, such as a wireless device cradle. The wireless devices 740, 742 may communicate with a wireless wide area network, such as a cellular telephone system suitable for communicating with a public switching telephone network (PSTN). Accordingly, wireless devices 740, 742 may communicate using any known or future wireless standard, such as, for example, code division multiple access (CDMA), time division multiple access (TDMA), advanced mobile phone standard (AMPS), group special module (GSM), including current and future protocols, such as the 3G and higher wireless communication protocols.

The communication apparatus 500 according to one embodiment includes a housing containing the processor 300, the WWAN transceiver 780, the WLAN transceiver 790 and the location information generator 792. Additional or fewer components may be included in the communication apparatus 500 other than those described above. As is known in the art, the processor 300, the WWAN transceiver 780, the WLAN transceiver 790 and the location information generator 792 may each be manufactured as separate circuit boards or integrated circuit chips from one or more manufacturers. The circuit boards may be interconnected as required through the use of a mother board, a flat or non-flat flexible multi-conductor cable, a multi-conductor wired cable or any suitable type of interconnection device. Each circuit board may be attached or coupled either directly or indirectly to the housing or to other circuit boards via a suitable fastening device as is known in the art, such as a connector, a clamp, a clip, a screw, a nut and a bolt. The integrated circuit chips may be interconnected as required via a circuit board, a multi-circuit chip carrier, a flat flexible multiconductor cable, a multiconductor wired cable or any suitable type of interconnection device. The circuit boards and integrated circuit chips may be mounted using chemical bonding such as an adhesive or any suitable fastening device.

According to one embodiment, the communication apparatus 500 housing may include: a circuit board comprising the processor 300 and memory 320, a circuit board comprising the WWAN transceiver 780, and a circuit board comprising the WLAN transceiver 790. The circuit boards may be interconnected and attached or coupled to the housing either directly or indirectly as previously discussed. Additionally, the communication apparatus 500 housing may include connectors for coupling to external components such as the audio system 540, the microphone 560, WWAN antenna 730, WLAN antenna 770, WWAN transceiver 710 or any other suitable device. For example, the communication apparatus 500 may interface with other suitable components not described herein. The connectors may be any suitable device for interconnecting the communication apparatus 500 to any external components such as a wired cable, a fiber optic link, or a radio frequency interface.

According to one embodiment, the communication apparatus 500 is a telematics communication module supporting the collection and dissemination of data, including audio speech. For example, the telematics communication module may be based on General Motors' OnStar System, which automatically calls for emergency assistance if the vehicle is in an accident. According to another embodiment, the communication apparatus 500 also can perform such functions as remote engine diagnostics, tracking stolen vehicles and providing roadside assistance, as well as other functions.

Figure 8:
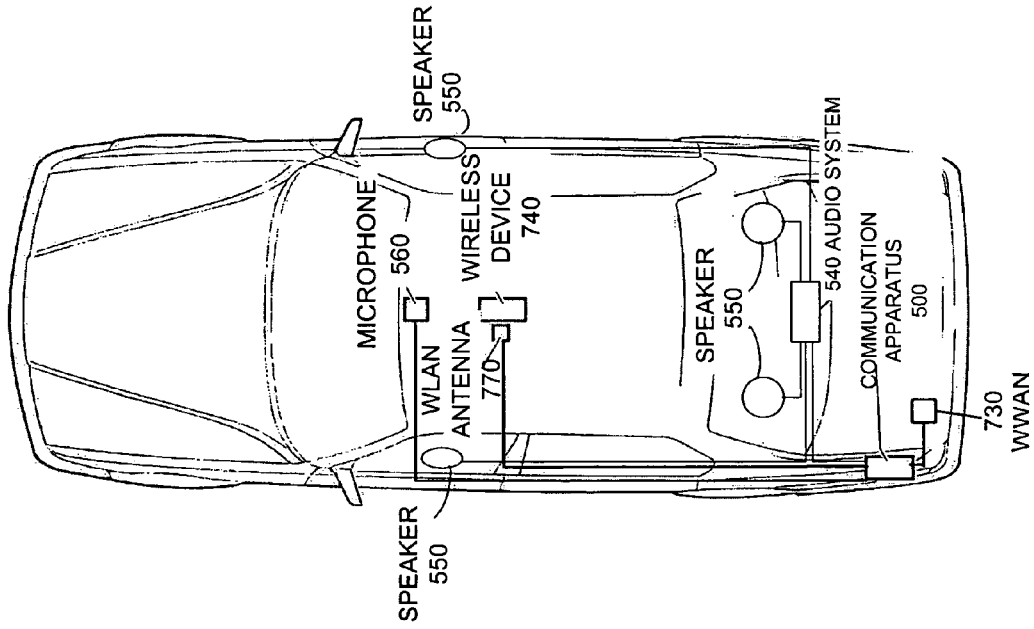
FIG. 8 is a block diagram of an in-vehicle communication system according to one exemplary embodiment of the invention.

FIG. 8 is a block diagram of an in-vehicle communication system 800 according to at least one embodiment of the invention. According to one embodiment, the in-vehicle communication system 800 includes the communication apparatus 500 coupled to the wireless device 740 via the WLAN antenna 770. For example, the communication interface between the wireless device 740 and the communication apparatus 500 may be a Bluetooth interface as previously discussed.

According to one embodiment, the in-vehicle communication system 800 may include the wireless wide area network transceiver 780 integrated into the communication apparatus 500 as discussed previously with respect to one embodiment FIG. 7. Alternatively, the communication apparatus 500 may interface with the wireless wide area network transceiver 710 externally to the communication apparatus 500 and may be mounted in any suitable location. The communication apparatus 500 is also shown to interface with the audio system 540. Although the audio system 540 and the communication apparatus 500 are shown in the trunk area of the vehicle, the communication apparatus 500 and/or the audio system 540 may be located in any suitable location, including inside the dashboard or under the dashboard. For example, the communication apparatus 500 may be integrated within the audio system 540 within the dashboard of the in-vehicle communication system 800. For example, the vehicle's audio system 540 may include the communication apparatus 500 and any necessary transceiver, such as the wireless wide area network transceiver 780 and the WLAN transceiver 790.

Among other advantages, the present invention permits the echo canceler to more accurately detect a change in acoustic coupling or a change in an audio system, such as a change in amplifier gain. The echo canceler detects a change in the acoustic coupling channel and in the audio system by detecting a change in the echo return loss data. Accordingly, any change in the acoustic coupling between the microphone and the speaker and any change in the audio path, such as a change in the audio gain, will cause a corresponding change in the echo return loss data.

According to one embodiment, the amplifier in the audio system is considered part of the acoustic coupling channel. As a result, a change in the gain of the amplifier in the audio system will produce a corresponding change in amplitude in both the downlink audio signal, and the pre-echo canceler uplink data received by the microphone. Consequently, a change in amplifier gain will create a corresponding change in the echo return loss data. Accordingly, the echo canceler adaptive filter may adapt to both changes in the acoustic coupling channel as well as changes in the amplifier gain.

The echo canceler circuit tracks the echo return loss data and can determine if the echo return loss data decreases or increases above a particular rate beyond the capabilities of the adaptive filter. The echo canceler may quickly determine if the echo return loss exceeds the capabilities of the adaptive filter and attenuate the post-echo canceler uplink data in order to avoid the transmission of corrupted uplink data and thus avoid the transmission of annoying loud noises at the far end. For example, if the amplifier gain is increased, the echo canceler may determine that since the amplitude of the downlink audio data has not changed, then the increase in echo return loss is due to increased acoustic coupling, and therefore the echo canceler may take appropriate action to reduce the transmission of undesirable loud noises at the far end. Accordingly, the echo canceler may be able to quickly determine if the adaptive filter is about to become unstable and is about to produce corrupted data. Therefore, the echo canceler may attenuate the post-echo canceler uplink data before the adaptive filter becomes unstable and produces corrupted data. As previously discussed, the prior art method of attenuating the post-echo canceler uplink data and the downlink data based on the amplitude or power level of the post-echo canceler uplink data may be due to an increase in the downlink data power level and not due to a change in the acoustic coupling channel. Consequently, the echo canceler of the present invention avoids unnecessarily attenuating the post-echo canceler uplink data. As a result, the echo canceler will permit the near end user to speak as desired without being attenuated due to incorrectly interpreting the increase in post-echo canceler data power as an increase in acoustic coupling.

It is understood that the implementation of other variations and modifications of the present invention and its various aspects will be apparent to those of ordinary skill in the art and that the present invention is not limited by the specific embodiments described. It is therefore contemplated to cover by the present invention any modifications, variations or equivalents that fall within the spirit and scope of the basic underlying principles disclosed and claimed herein.

What is claimed is:

1. An echo canceler circuit comprising:
an uplink data attenuator operative to receive post-echo canceler uplink data and uplink echo return loss based attenuation data and in response to attenuate the post-echo canceler uplink data to produce attenuated uplink data; and
an echo return loss based attenuation data generator operatively coupled to the uplink data attenuator and operative to produce the uplink echo return loss based attenuation data in response to instantaneous echo return loss data, wherein the instantaneous echo return loss data is based on attenuated downlink data and pre-echo canceler uplink data, and wherein the echo return loss based attenuation data generator updates failsafe echo return loss data based on the instantaneous echo return loss data and updates standard echo return loss data based on the instantaneous echo return loss data when not in a double talk mode, wherein the echo return loss based attenuation data generator produces the uplink echo return loss based attenuation data based on (a) the standard echo return loss data when the echo return loss based attenuation data generator determines that at least one of: the standard echo return loss data and the failsafe echo return loss data indicates no problematic acoustic coupling channel, and (b) the failsafe echo return loss data when the echo return loss based attenuation data generator determines that at least one of: the standard echo return loss data and the failsafe echo return loss data indicates a problematic acoustic coupling channel.

2. The echo canceler circuit of claim 1 wherein the echo return loss based attenuation data generator is operative to calculate the instantaneous echo return loss data based on a ratio of the attenuated downlink data and the pre-echo canceler uplink data.

3. The echo canceler circuit of claim 1 wherein the uplink data attenuator is operative to attenuate the post-echo canceler uplink data over a period of time to produce the attenuated uplink data.

4. An echo canceler circuit comprising:
an uplink data attenuator operative to receive post-echo canceler uplink data and uplink echo return loss based attenuation data and in response to attenuate the post-echo canceler uplink data to produce attenuated uplink data;
a downlink data attenuator operative to receive downlink data and downlink echo return loss based attenuation data and in response to attenuate the downlink data to produce attenuated downlink data; and
an echo return loss based attenuation data generator operatively coupled to the uplink data attenuator and the downlink data attenuator and operative to produce the uplink echo return loss based attenuation data and the downlink echo return loss based attenuation data in response to instantaneous echo return loss data wherein the instantaneous echo return loss data is based on attenuated downlink data and pre-echo canceler uplink data, and wherein the echo return loss based attenuation data generator updates failsafe echo return loss data based on the instantaneous echo return loss data and updates standard echo return loss data based on the instantaneous echo return loss data when not in a double talk mode, wherein the echo return loss based attenuation data generator produces the uplink echo return loss based attenuation data and the downlink echo return loss based attenuation data based on (a) the standard echo return loss data when the echo return loss based attenuation data generator determines that at least one of: the standard echo return loss data and the failsafe echo return loss data indicates no problematic acoustic coupling channel, and (b) the failsafe echo return loss data when the echo return loss based attenuation data generator determines that at least one of: the standard echo return loss data and the failsafe echo return loss data indicates a problematic acoustic coupling channel.

5. The echo canceler circuit of claim 4 wherein the echo return loss based attenuation data generator is operative to calculate the instantaneous echo return loss data based on a ratio of the attenuated downlink data and the pre-echo canceler uplink data.

6. The echo canceler circuit of claim 4 further comprising:
a digital to analog converter operatively coupled to the downlink data attenuator, and operative to receive the attenuated downlink data and in response to produce a downlink audio signal;
an amplifier, operatively coupled to the digital to analog converter, and operative to receive the downlink audio signal and in response to produce an amplified downlink audio signal, wherein the amplifier has an amplifier gain;
a microphone operative to receive at least a portion of the amplified downlink audio signal and in response to produce a pre-echo canceler uplink signal; and
an analog to digital converter operatively coupled to the microphone, the uplink data attenuator and the echo return loss based attenuation data generator and operative to receive the pre-echo canceler uplink signal and in response, to produce the pre-echo canceler uplink data wherein the echo return loss based attenuation data generator determines a change in the amplifier gain based on the instantaneous echo return loss data.

7. The echo canceler of claim 4 wherein the uplink data attenuator is operative to attenuate the post-echo canceler uplink data over a first period of time to produce the attenuated uplink data, and the downlink data attenuator is operative to attenuate the downlink data over a second period of time to produce the attenuated downlink data.

8. A communication apparatus comprising:
a housing having coupled therewith:
an echo canceler circuit within the housing including:
an uplink data attenuator operative to receive post-echo canceler uplink data and uplink echo return loss based attenuation data and in response to attenuate the post-echo canceler uplink data to produce attenuated uplink data;
an echo return loss based attenuation data generator operatively coupled to the uplink data attenuator and operative to produce the uplink echo return loss based attenuation data in response to instantaneous echo return loss data, wherein the instantaneous echo return loss data is based on attenuated downlink data and pre-echo canceler uplink data, and wherein the echo return loss based attenuation data generator updates failsafe echo return loss data based on the instantaneous echo return loss data and updates standard echo return loss data based on the instantaneous echo return loss data when not in a double talk mode, wherein the echo return loss based attenuation data generator produces the uplink echo return loss based attenuation data based on (a) the standard echo return loss data when the echo return loss based attenuation data generator determines that at least one of: the standard echo return loss data and the failsafe echo return loss data indicates no problematic acoustic coupling channel, and (b) the failsafe echo return loss data when the echo return loss based attenuation data generator determines that at least one of: the standard echo return loss data and the failsafe echo return loss data indicates a problematic acoustic coupling channel; and
a transceiver within the housing operatively coupled to the uplink data attenuator and operative to receive the attenuated uplink data and in response to transmit the attenuated uplink data.

9. The communication apparatus of claim 8 wherein the transceiver is at least one of: a wireless wide area network (WWAN) transceiver, a wireless local area network (WLAN) and a wireless device.

10. The communication apparatus of claim 8 wherein the communication apparatus includes at least one of: a speakerphone and a telephone.

11. The communication apparatus of claim 9 further including a location information generator coupled to the transceiver and operative to produce location information.

12. The communication apparatus of claim 8 wherein the transceiver receives downlink audio data and in response provides the downlink audio data to the echo canceler circuit.

13. An in-vehicle communication system comprising:
an echo canceler circuit comprising:
an uplink data attenuator operative to receive post-echo canceler uplink data and uplink echo return loss based attenuation data and in response to attenuate the post-echo canceler uplink data to produce attenuated uplink data;
an echo return loss based attenuation data generator operatively coupled to the uplink data attenuator and operative to produce the uplink echo return loss based attenuation data in response to instantaneous echo return loss data wherein the instantaneous echo return loss data is based on attenuated downlink data and pre-echo canceler uplink data, and wherein the echo return loss based attenuation data generator updates failsafe echo return loss data based on the instantaneous echo return loss data and updates standard echo return loss data based on the instantaneous echo return loss data when not in a double talk mode, wherein the echo return loss based attenuation data generator produces the uplink echo return loss based attenuation data based on (a) the standard echo return loss data when the echo return loss based attenuation data generator determines that at least one of: the standard echo return loss data and the failsafe echo return loss data indicates no problematic acoustic coupling channel, and (b) the failsafe echo return loss data when the echo return loss based attenuation data generator determines that at least one of: the standard echo return loss data and the failsafe echo return loss data indicates a problematic acoustic coupling channel;
a wireless transceiver operatively coupled to the uplink data attenuator and operative to receive the attenuated uplink data and in response to transmit the attenuated uplink data;
an audio system including:
an amplifier, operatively coupled to the echo canceler circuit, and operative to receive the attenuated downlink data and in response to produce an amplified downlink audio signal; and
a playback module including at least one of: a tuner module, a tape player, a CD player, a DVD player, operatively coupled to the amplifier and operative to provide a playback audio signal to the amplifier.

14. The in-vehicle communication system of claim 13 wherein the wireless transceiver is at least one of: a wireless wide area network (WWAN) transceiver, a wireless local area network (WLAN) transceiver and a wireless device.

15. The in-vehicle communication system of claim 13 wherein the echo return loss based attenuation data generator is operative to calculate the instantaneous echo return loss data based on a ratio of the attenuated downlink data and the pre-echo canceler uplink data.

16. The in-vehicle communication system of claim 13 including at least one speaker, operatively coupled to the amplifier, and operative to receive the amplified downlink audio signal and in response to acoustically produce the amplified downlink audio signal.

17. The in-vehicle communication system of claim 13 further including a microphone operative to receive at least a portion of the amplified downlink audio signal and in response to produce the pre-echo canceler uplink signal.

18. The in-vehicle communication system of claim 13 wherein the uplink data attenuator is operative to attenuate the post-echo canceler uplink data over a period of time to produce the attenuated uplink data.

19. The in-vehicle communication system of claim 13 wherein the amplifier has an amplifier gain, and wherein the echo return loss based attenuation data generator determines a change in the amplifier gain based on the instantaneous echo return loss data.

* * * * *

UNITED STATES PATENT AND TRADEMARK OFFICE
CERTIFICATE OF CORRECTION

PATENT NO. : 7,599,483 B2  Page 1 of 1
APPLICATION NO. : 10/735272
DATED : October 6, 2009
INVENTOR(S) : Piket et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Twenty-eighth Day of September, 2010

David J. Kappos
*Director of the United States Patent and Trademark Office*